United States Patent
Sato

(10) Patent No.: US 8,887,779 B2
(45) Date of Patent: Nov. 18, 2014

(54) PNEUMATIC TIRE

(75) Inventor: Yoshiki Sato, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 642 days.

(21) Appl. No.: 13/180,706

(22) Filed: Jul. 12, 2011

(65) Prior Publication Data

US 2012/0067478 A1 Mar. 22, 2012

(30) Foreign Application Priority Data

Sep. 16, 2010 (JP) .................................. 2010-208179

(51) Int. Cl.
*B60C 11/01* (2006.01)
*B60C 11/117* (2006.01)
*B60C 11/03* (2006.01)

(52) U.S. Cl.
CPC ............. *B60C 11/01* (2013.01); *B60C 11/0306* (2013.04); *B60C 2011/0351* (2013.04)
USPC ............. 152/209.16; 152/209.17; 152/209.18

(58) Field of Classification Search
CPC B60C 11/01; B60C 11/0306; B60C 11/0309; B60C 11/03; B60C 11/11; B60C 2011/0351; B60C 2011/01; B60C 2011/013; B60C 2011/1259; B60C 2011/1236; B60C 13/02; B60C 13/023; B60C 2013/026; B60C 2011/0381

USPC ............... 152/209.1, 209.15, 209.16, 209.17, 152/209.18, 209.25; D12/605, 569–571, D12/534–536, 506

See application file for complete search history.

(56) References Cited

U.S. PATENT DOCUMENTS

| | | | | |
|---|---|---|---|---|
| 4,265,287 A * | 5/1981 | Abe et al. | ................. | 152/209.16 |
| 4,993,466 A * | 2/1991 | Ochiai | ..................... | 152/209.16 |
| 5,010,936 A * | 4/1991 | Numata et al. | ........... | 152/209.14 |
| 6,283,184 B1* | 9/2001 | Tomita | ..................... | 152/209.18 |
| 2007/0227638 A1* | 10/2007 | Kaji et al. | ................ | 152/209.16 |

FOREIGN PATENT DOCUMENTS

JP 2001001719 A 1/2001

OTHER PUBLICATIONS

JP 2001-001719, Jan. 9, 2001, English language machine translation [retrieved from internet: http://www.ipdl.inpit.go.jp/homepg_e.ipdl].*

* cited by examiner

*Primary Examiner* — Eric Hug

(74) *Attorney, Agent, or Firm* — Fish & Richardson P.C.

(57) ABSTRACT

A pneumatic tire has a tread pattern including a lateral groove extending in a direction intersecting a tire circumferential direction and a shoulder block comparted by the lateral groove. A depression region in which a plurality of depressions extending in the tire circumferential direction are arranged in a tire width direction are formed on a surface of the shoulder block in an outer side in the tire width direction than a ground-contact end. The depressions are open to the lateral groove, and are segmented in a center portion in the tire circumferential direction of the shoulder block.

8 Claims, 2 Drawing Sheets

PNEUMATIC TIRE

BACKGROUND OF THE INVENTION

1. Field of the Invention

The present invention relates to a pneumatic tire structured such that a rolling resistance can be reduced while maintaining steering stability.

2. Description of the Related Art

Under a condition that concern for global environment protection is raised in recent years, a rolling resistance of a tire greatly contributes to fuel consumption performance of a vehicle, and it is necessary to effectively reduce it. Conventionally, there has been proposed a technique of reducing the rolling resistance by changing a composition of tread rubber, however, since it affects the steering stability and wear resistance performance of the tire not a little, there is strongly desired a method which can reduce the rolling resistance independently from the rubber composition.

In order to reduce the rolling resistance, it is important to suppress an energy loss when the tire rolls, and it has been known that a strain generated in a tread portion is greatly involved in such an energy loss. Further, after the present inventor has devoted himself to study, it has been known that a strain tends to be locally concentrated in a region 20 in the periphery of a groove bottom of a main groove 23 facing a shoulder block 25 as shown in FIG. 5 when the tire comes into contact with the ground, and an increase of the strain causes an energy loss so as to deteriorate the rolling resistance.

Japanese Unexamined Patent Publication No. 2001-1719 describes a pneumatic tire in which a narrow groove extending continuously in a tire circumferential direction is provided in a surface of a shoulder block in an outer side in a tire width direction than a ground-contact end. However, since this tire only intends to reduce a road noise by absorbing a vibration by the narrow groove when the tire rolls, and a reduction of rigidity in the tire circumferential direction is caused not a little by the narrow groove, there is a risk that the steering stability is deteriorated. Further, this document defines maintenance of the fuel consumption performance as an effect obtained by such a matter that it is not necessary to make rubber of a tread portion thick.

SUMMARY OF THE INVENTION

The present invention has been made in view of the above circumstances, and an object thereof is to provide a pneumatic tire which can reduce a rolling resistance while maintaining steering stability.

The object can be achieved by the following present invention. That is, the present invention provides a pneumatic tire comprising a tread pattern including a lateral groove extending in a direction intersecting a tire circumferential direction, and a shoulder block comparted by the lateral groove, wherein a depression region in which a plurality of depressions extending in the tire circumferential direction are arranged in a tire width direction are formed on a surface of the shoulder block in an outer side in the tire width direction than a ground-contact end, and the depressions are open to the lateral groove, and are segmented in a center portion in the tire circumferential direction of the shoulder block.

In the pneumatic tire according to the present invention, since the depression region in which a plurality of depressions extending in the tire circumferential direction are arranged in the tire width direction is formed in the surface of the shoulder block, a buttress portion of the tire deflects easily, and it is possible to reduce the rolling resistance by dispersing the strain which tends to concentrate on the periphery of the groove bottom of the main groove facing the shoulder block. In addition, since the depression region is formed in the outer side in the tire width direction than the ground-contact end, and the depressions are segmented in the center portion in the tire circumferential direction of the shoulder block, it is possible to effectively maintain the steering stability by suppressing the rigidity reduction caused by the depression region. Further, since the depressions are open to the lateral groove, the rigidity change in the tire circumferential direction becomes gentle, and it is possible to enhance the effect of reducing the rolling resistance by making the strain generated in the periphery of the groove bottom of the lateral groove comparting the shoulder block small.

In the present invention, it is preferable that the depression region extends from a start end position in the outer side in the tire width direction than the ground-contact end to the vicinity of an end edge position of the shoulder block close to a side wall portion. According to the structure mentioned above, the steering stability is easily maintained by preferably suppressing the rigidity reduction caused by forming the depression region. Particularly, since it is possible to prevent an extreme reduction of the ground-contact area at a cornering time of the limit area when the ground-contact surface of the tire is expanded to the outer side in the tire width direction, the steering stability is effectively maintained.

In the present invention, it is preferable that the depressions are formed in such a shape that a width is larger than a depth. Accordingly, it is possible to effectively reduce the rolling resistance by securing flexibility of the buttress portion of the tire, and appropriately achieving the strain dispersing effect mentioned above.

In the present invention, it is preferable that a width of the depression becomes larger toward the outer side in the tire width direction. According to the structure mentioned above, since the outer portion of the depression region in the tire width direction becomes comparatively soft, and the inner portion becomes comparatively hard, it is possible to well maintain the steering stability as well as it is possible to improve the strain dispersing effect mentioned above so as to well reduce the rolling resistance.

DETAILED DESCRIPTION OF THE PREFERRED EMBODIMENTS

Figure 1:
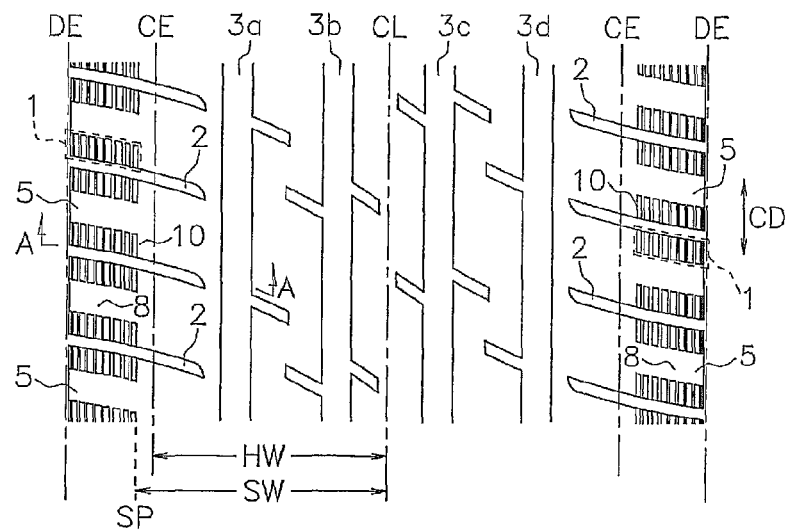
FIG. 1 is a development view showing an example of a tread pattern in a pneumatic tire according to the present invention.
Figure 2:
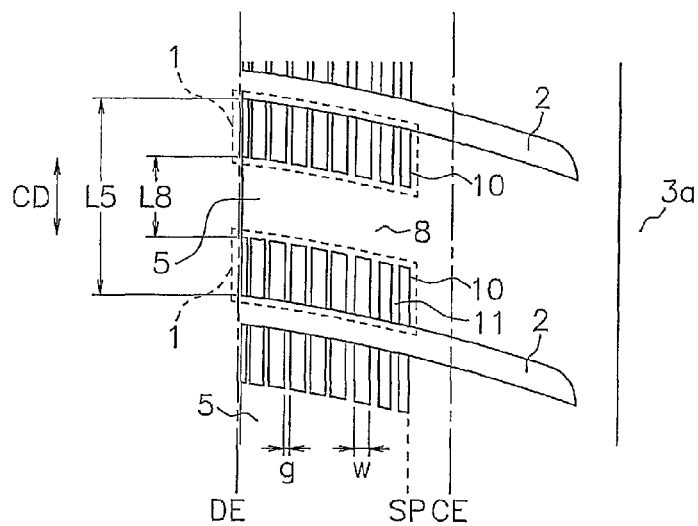
FIG. 2 is a view showing a substantial part of FIG. 1 in an enlarged manner.
Figure 3:
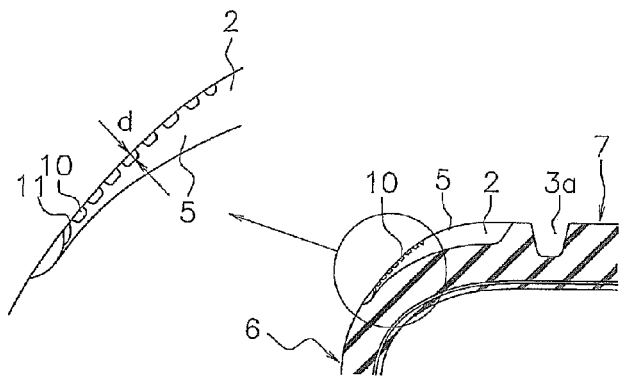
FIG. 3 is a cross sectional view as seen from an arrow A-A of FIG. 1.

An embodiment of the present invention will be explained with reference to the drawings. FIG. 1 is a development view showing an example of a tread pattern in a pneumatic tire according to the present invention. FIG. 2 is a view showing a substantial part of FIG. 1 in an enlarged manner, and FIG. 3 is a cross sectional view as seen from an arrow A-A of FIG. 1. As shown in FIG. 1, the pneumatic tire according to the present invention is provided with a tread pattern including lateral grooves 2 extending in a direction intersecting a tire circumferential direction CD, and shoulder blocks 5 comparted by the lateral grooves 2.

The tread surface is provided with four main grooves 3a to 3d extending along the tire circumferential direction CD, and the shoulder blocks 5 are provided in an outer side in a tire width direction of the main grooves 3a and 3d positioned in an outermost side thereof. The lateral groove 2 comparting the shoulder block 5 extends while intersecting a ground-contact end CE and reaches a design end DE serving as an end edge position of the shoulder block 5 close to a side wall portion 6. The lateral groove 2 is formed flat in its groove wall surface in the same manner as the main groove, and the lateral groove 2 is not open to the main grooves 3a and 3d in the present embodiment, however, the lateral groove 2 may be open.

The ground-contact end CE is positioned on the shoulder block 5, and a position between the ground-contact end CE and the design end DE corresponds to a position called a buttress portion. The buttress portion is a portion which is positioned in an outer side in a tire diametrical direction of the side wall portion 6, and which does not come into contact with the ground at a normal traveling time on a flat paved road. A ground-contact half width HW is measured as a distance in the tire width direction from a tire equator line CL serving as a center line to the ground-contact end CE. The ground-contact end CE is an outermost position in the tire width direction at the time of making a tire, which is assembled in a normal rim and to which a normal internal pressure and a normal load are applied, come into contact with the ground on a flat road surface.

The normal rim corresponds to a standard rim defined in JATMA, "Design Rim" defined in TRA, and "Measuring Rim" defined in ETRTO. The normal internal pressure corresponds to a maximum pneumatic pressure defined in JATMA, a maximum value described in Table "TIRE LOAD LIMITS AT VARIOUS COLD INFLATION PRESSURES", and "INFLATION PRESSURE" defined in ETRTO. The normal load corresponds to a maximum load capacity defined in JATMA, a maximum value described in the Table in TRA, or "LOAD CAPACITY" defined in ETRTO.

The pneumatic tire is structured, as shown in FIGS. 2 and 3 in an enlarged manner, such that a depression region 1 in which a plurality of depressions 10 extending in the tire circumferential direction CD are arranged in the tire width direction is formed in a surface of the shoulder block 5 in an outer side in the tire width direction than the ground-contact end CE. In this depression region 1, the shallow groove-like depressions 10 are open to the lateral groove 2 and is segmented in a center portion of the tire circumferential direction CD of the shoulder block 5. For the sake of convenience of illustration, a broken line frame showing the depression region 1 is drawn so as to be expanded to a periphery, however, the actual depression region 1 is a region which is formed by the depressions 10 and narrow ribs 11 interposing therebetween.

Since the depression region 1 mentioned above is formed, the buttress portion of the tire deflects easily, and it is possible to reduce the rolling resistance by dispersing the strain which tends to concentrate on the periphery of the groove bottom of the main grooves 3a and 3d. In addition, since the depression region 1 is formed in the outer side in the tire width direction than the ground-contact end CE, and the depressions 10 are segmented in the center portion of the shoulder block, it is possible to effectively maintain the steering stability by suppressing the rigidity reduction in the tire circumferential direction. Further, since the depressions 10 are open to the lateral groove 2, the rigidity change in the tire circumferential direction CD becomes gentle, and it is possible to enhance the effect of reducing the rolling resistance by making the strain generated in the periphery of the groove bottom of the lateral groove 2 comparting the shoulder block 5 small.

In the present embodiment, the depression region 1 extends from a start end position SP in an outer side in the tire width direction than the ground-contact end CE to the design end DE (the end edge position of the shoulder block 5 close to the side wall portion 6). Accordingly, the steering stability is easily maintained by preferably suppressing the rigidity reduction caused by forming the depression region 1. Further, in this case, since it is possible to prevent an extreme reduction of a ground-contact area at the cornering time of the limit area in which the ground-contact surface of the tire expands greatly to the outer side in the tire width direction than the ground-contact end CE, it is useful for maintaining the steering stability.

In the depression region 1 according to the present embodiment, the depression 10 positioned in the outermost side in the tire width direction comes into contact with the design end DE. On the contrary, even in the case where the depression 10 positioned in the outermost side is away from the design end DE, if the distance in the tire width direction from the depression 10 to the design end DE is equal to or less than a distance g of the depression 10 mentioned below, the depression region 1 is defined to extend to the design end DE. The start end position SP is an end edge position in an inner side in the tire width direction of the depression 10 which is closest to the tire equator line CL in the depression region 1.

It is preferable that a distance SW in the tire width direction from the tire equator line CL to the start end position SP of the depression region 1 is between 1.04 and 1.25 times of the ground-contact half width HW. In the case of being less than this range, the depression region 1 comes closer to the ground-contact surface, and an effect of maintaining the steering stability tends to become smaller. Further, in the case of being greater than this range, it becomes hard to secure a size of the depression region 1, and an action for dispersing the strain mentioned above becomes smaller, there is a risk that the effect of reducing the rolling resistance becomes smaller.

A width w of the depression 10 is set, for example, to 0.5 to 3.0 mm. A depth d of the depression 10 is set, for example, to 0.3 to 3.0 mm. The strain which tends to concentrate on the periphery of the groove bottom of the main grooves 3a and 3d is well dispersed by making the width w equal to or more than 0.5 mm or making the depth d equal to or more than 0.3 mm, whereby it becomes easy to secure the effect of reducing the rolling resistance. Further, it becomes easy to suppress the rigidity reduction caused by the depression region 1 so as to maintain the steering stability, by making the width w equal to or less than 3.0 mm or making the depth d equal to or less than 3.0 mm.

The distance g of the depression 10 is set, for example, to 0.5 to 3.0 mm. It becomes easy to secure the effect of reducing the rolling resistance without deteriorating the flexibility of the buttress portion, by making the distance g equal to or more than 0.5 mm. Further, it becomes easy to secure the effect of reducing the rolling resistance while suppressing an excessive reduction of the rigidity caused by forming the depression region 1, by making the distance g equal to or less than 3.0 mm. The distance g of the depression 10 corresponds to a width of the narrow rib 11 interposed between the depressions 10 which are lined up in the tire width direction.

As shown in FIGS. 2 and 3, the present embodiment is formed in such a manner that the width w of the depression 10 becomes larger toward an outer side in the tire width direction (a left side in the illustrated example). Accordingly, since the outer portion of the depression region 1 in the tire width direction becomes comparatively soft, and the inner portion becomes comparatively hard, it is possible to well maintain the steering stability as well as it is possible to improve the strain dispersing effect mentioned above so as to well reduce the rolling resistance. Even in the structure mentioned above, it is preferable that the width w of the depression 10 is in the range mentioned above.

A cross sectional shape of the depression 10 is not particularly limited, however, is preferably such a shape that the width w is larger than the depth d, for appropriately expressing the strain dispersing effect while securing the flexibility of the buttress portion. The number of the depression 10 forming the depression region 1 is preferably equal to or more than four, and is further preferably equal to or more than five, for appropriately reducing the rolling resistance while securing the strain dispersing effect.

As shown in FIG. 2, in the shoulder block 5, the depression region 1 is formed in both sides in the tire circumferential direction CD, and a non-depression region 8 is formed therebetween. If a length L5 of the shoulder block 5 is set to 1.0, a length L8 of the non-depression region 8 is preferably in a range of ±0.3 from the center in the tire circumferential direction of the shoulder block 5. Accordingly, it becomes easy to express the effect of reducing the rolling resistance while securing the size of the depression region 1, and it is effective for suppressing an irregular wear of the shoulder block 5.

It is preferable that a rate of an area of the depression region 1 with respect to an area of the shoulder block 5 between the start end position SP and the design end DE is within a range between 0.4 and 0.6. Since the rate is equal to or more than 0.4, it is possible to smoothly disperse the strain which tends to concentrate on the periphery of the groove bottom of the main grooves 3a and 3b, while securing the size of the depression region 1. Further, since the rate is equal to or less than 0.6, it is easy to maintain the steering stability while suppressing the rigidity reduction caused by the depression region 1.

The pneumatic tire according to the present invention can be structured in the same manner as the normal pneumatic tire except for the provision of the shoulder block with the depression region as mentioned above. Accordingly, although an entire illustration is omitted, the tire is provided with a pair of bead portions, the side wall portions 6 extending to the outer side in the tire diametrical direction from the bead portions, and the tread portion 7 connected to the outer end in the tire diametrical direction of the side wall portions 6 via the buttress portion. Generally, the design end DE is arranged in a range between 0.3 and 0.2 of the tire cross sectional height, based on the tire outer peripheral end of the tread portion.

The present invention is not limited to the embodiment mentioned above, but can be improved and modified variously within the scope which does not depart from the purpose of the present invention, and the tread pattern or the like can be appropriately changed in correspondence to an employed intended use and a condition.

EXAMPLE

An example tire which concretely shows the structure and effect of the present invention will be explained. In a test tire provided for evaluating each of performances, a tire size is 195/65R15, a using rim is 6J, and a pneumatic pressure is 200 kPa. An evaluation of each of performances is executed as follows.

(1) Rolling Resistance (Fuel Consumption Performance)

A rolling resistance was measured according to International Standard ISO28580 (JISD4234), and an inverse number thereof was calculated. An evaluation is carried out on by using an index number with a result of a comparative example 1 being set to 100, indicating that the larger the numerical value is, the smaller the rolling resistance and an excellent fuel consumption performance.

(2) Steering Stability

The test tire was installed to an actual car (domestically built 2000 cc sedan vehicle) so as to travel on a dry road surface, and a feeling test was carried out by a driver. An evaluation is carried out on by using an index number with a result of a comparative example 1 being set to 100, indicating that the larger the numerical value is, the more excellent the steering stability is.

In the tread pattern in FIG. 1, the pattern in which the depression region is not formed was set to Comparative Example 1, the patterns in which the depression regions shown in FIGS. 4(a) to 4(d) are formed were set to Comparative Examples 2 to 5, and the patterns in which the depression region shown in FIG. 2 is formed were set to Examples 1 and 2. In Comparative Examples 2 and 3, and Example 1, the width of the depression was formed uniformly, and Example 2 was formed in such a manner that the width of the depression is increased toward the outer side in the tire width direction. In the result of evaluation shown in Table 1, an area of the depression region represents a rate of an area of the depression region with respect to an area of the shoulder block between the start end position and the design end.

TABLE 1

| | | Comparative Example 1 | Comparative Example 2 | Comparative Example 3 | Comparative Example 4 | Comparative Example 5 | Example 1 | Example 2 |
|---|---|---|---|---|---|---|---|---|
| Depression (unit: mm) | Width | — | 2 | 2 | 20 | 20 | 1 | 1-2 |
| | Depth | — | 0.5 | 0.5 | 0.5 | 0.5 | 0.5 | 0.5 |
| | Distance | — | 1 | 1 | — | — | 1 | 1-0.5 |
| Depression region | Position | None | All region | Center | Both ends | Center | Both ends | Both ends |
| | Area | 0 | 1.0 | 0.46 | 0.54 | 0.46 | 0.54 | 0.54 |
| | Rolling resistance | 100 | 110 | 105 | 109 | 105 | 109 | 110 |
| | Steering stability | 100 | 90 | 95 | 93 | 93 | 98 | 98 |

In Comparative Example 1, since the depression region is not formed in the shoulder block, and an action of promoting the deflection of the buttress portion does not appear, the rolling resistance results in the most inferior one. On the contrary, since the rigidity reduction by the depression region is not caused, the steering stability is comparatively excellent.

Figure 4:
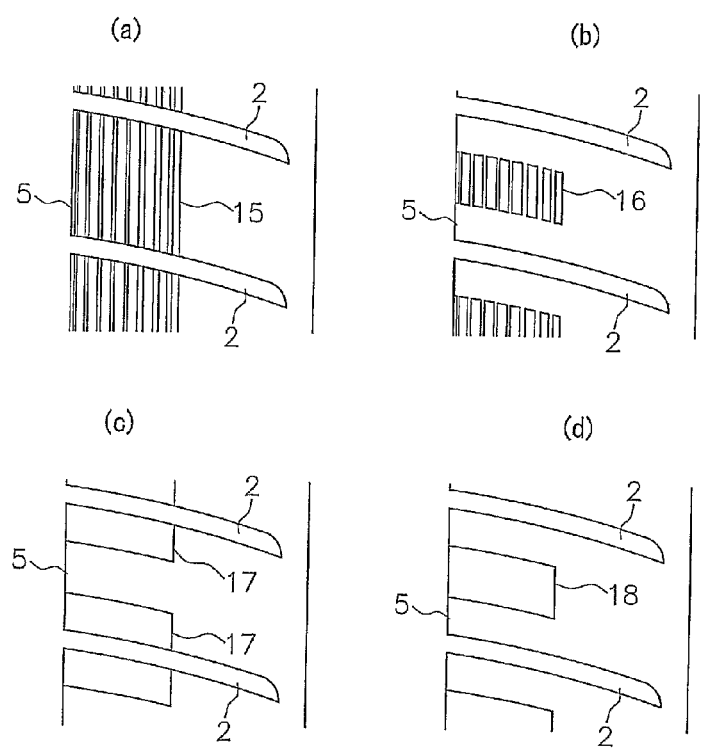
FIGS. 4(a) to 4(d) are views showing a depression region in a comparative example.
Figure 5:
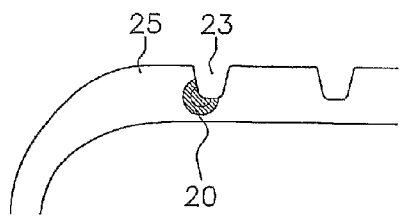
FIG. 5 is a cross sectional view of a substantial part for describing a strain generated when a tire comes into contact with the ground.

In Comparative Example 2, since a depression 15 extending continuously in the tire circumferential direction is arranged in the tire width direction as shown in FIG. 4(a), the effect of reducing the rolling resistance can be obtained. However, on the other hand, since the rigidity reduction is caused by the depression region formed by the depressions 15, the steering stability is greatly lowered.

In Comparative Example 3, there are formed depressions 16 which are segmented in both end portions in the tire circumferential direction of the shoulder block 5 as shown in FIG. 4(b), the effect of reducing the rolling resistance can be obtained, however, an improving effect thereof is not great. It is thought that this is caused by the matter that the non-depression region is adjacent to the lateral groove 2, whereby the rigidity change in the tire circumferential direction becomes rapid, and a great strain is generated in the periphery of the groove bottom of the lateral groove 2.

In Comparative Example 4, there is formed a depression 17 which is concaved wholly from the start end position SP to the design end DE as shown in FIG. 4(c). In Comparative Example 5, there is formed a depression 18 which is concaved wholly from the start end position SP to the design end DE and is segmented in both end portions in the tire circumferential direction of the shoulder block 5 as shown in FIG. 4(d). Accordingly, since the rigidity in the tire circumferential direction becomes small, and the ground-contact area is extremely lowered at a cornering time in the limit area, the steering stability is deteriorated.

On the contrary, in Examples 1 and 2, the buttress portion tends to deflect, by the depression region as shown in FIGS. 2 and 3, and it is possible to disperse the strain which tends to concentrate on the periphery of the groove bottom of the main groove so as to reduce the rolling resistance. In addition, since the depression 10 is segmented in the center portion in the tire circumferential direction of the shoulder block 5, the steering stability can be well maintained while suppressing the rigidity reduction caused by the depression region. Further, since the depressions 10 are open to the lateral groove 2, the rigidity change in the tire circumferential direction becomes gentle, and it is possible to secure the effect of reducing the rolling resistance. The effect of improving the rolling resistance is greater in Example 2 than in Example 1.

What is claimed is:

1. A pneumatic tire comprising a tread pattern including a pair of lateral grooves extending in a direction intersecting a tire circumferential direction, and a shoulder block formed by the lateral grooves, wherein
a depression region, in which a plurality of depressions extending in the tire circumferential direction are arranged in a tire width direction, is formed on a surface of the shoulder block in an outer side in the tire width direction than a ground-contact end, and all of the depressions extending in the tire circumferential direction are open to one but only one of the lateral grooves forming the shoulder block, and are segmented in a center portion in the tire circumferential direction of the shoulder block, and wherein the depressions are formed in such a shape that a width is larger than a depth.

2. The pneumatic tire according to claim 1, wherein the depression region extends from a start end position in the outer side in the tire width direction than the ground-contact end to the vicinity of an end edge position of the shoulder block close to a side wall portion.

3. The pneumatic tire according to claim 1, wherein the depression which is outermost in the tire width direction either is in contact with a design end, which is an end edge position of the shoulder block proximate a side wall portion of the tire, or is positioned away from the design end by a distance in the tire width direction that is equal to or less than a distance g between adjacent depressions.

4. A pneumatic tire comprising a tread pattern including a lateral groove extending in a direction intersecting a tire circumferential direction, and a shoulder block comparted by the lateral groove,
wherein a depression region, in which a plurality of depressions extending in the tire circumferential direction are arranged in a tire width direction, is formed on a surface of the shoulder block in an outer side in the tire width direction than a ground-contact end, and the depressions are open to the lateral groove, and are segmented in a center portion in the tire circumferential direction of the shoulder block, and
wherein a width of the depression becomes larger toward the outer side in the tire width direction.

5. The pneumatic tire according to claim 4, wherein the depression region extends from a start end position in the outer side in the tire width direction than the ground-contact end to the vicinity of an end edge position of the shoulder block close to a side wall portion.

6. The pneumatic tire according to claim 4, wherein the depressions are formed in such a shape that a width is larger than a depth.

7. A pneumatic tire comprising a tread pattern including a pair of lateral grooves extending in a direction intersecting a tire circumferential direction, and a shoulder block formed by the lateral grooves, wherein
a depression region, in which a plurality of depressions extending in the tire circumferential direction are arranged in a tire width direction, is formed on a surface of the shoulder block in an outer side in the tire width direction than a ground-contact end, and all of the depressions extending in the tire circumferential direction are open to one but only one of the lateral grooves forming the shoulder block, and are segmented in a center portion in the tire circumferential direction of the shoulder block, and wherein the plurality of depressions forming the depression region comprises four or more depressions.

8. The pneumatic tire according to claim 7, wherein the depression which is outermost in the tire width direction either is in contact with a design end, which is an end edge position of the shoulder block proximate a side wall portion of the tire, or is positioned away from the design end by a distance in the tire width direction that is equal to or less than a distance g between adjacent depressions.

* * * * *